(12) United States Patent
Floresta et al.

(10) Patent No.: US 6,239,516 B1
(45) Date of Patent: May 29, 2001

(54) HIGH PERFORMANCE IRONLESS LINEAR MOTOR WITH SUPPORTED WINDINGS

(75) Inventors: John G. Floresta, Commack; Xin Tian Wang, Central Islip, both of NY (US)

(73) Assignee: Kollmorgan Corporation, Waltham, MA (US)

( * ) Notice: Subject to any disclaimer, the term of this patent is extended or adjusted under 35 U.S.C. 154(b) by 0 days.

(21) Appl. No.: 09/055,647

(22) Filed: Apr. 6, 1998

(51) Int. Cl.$^7$ .................................................. H02K 41/00
(52) U.S. Cl. .................................................. 310/12
(58) Field of Search ........................... 310/12, 13, 14, 310/268; 318/135

(56) References Cited

U.S. PATENT DOCUMENTS

| | | | |
|---|---|---|---|
| 3,707,924 | * | 1/1973 | Barthalon et al. .................. 310/12 |
| 4,323,805 | * | 4/1982 | Caby et al. ........................ 310/237 |
| 4,398,112 | * | 8/1983 | van Gils ........................... 310/201 |
| 4,507,638 | * | 3/1985 | Brosh .................................. 336/79 |
| 4,543,615 | * | 9/1985 | Van Campenhout et al. ....... 358/285 |
| 4,705,971 | * | 11/1987 | Nagasaka ........................... 310/12 |
| 4,758,750 | | 7/1988 | Itagaki et al. ..................... 310/13 |
| 4,794,284 | | 12/1988 | Buon .................................. 310/12 |
| 5,087,844 | * | 2/1992 | Takedomi et al. ................. 310/12 |
| 5,197,180 | * | 3/1993 | Mihalko et al. .................... 29/596 |
| 5,315,198 | | 5/1994 | Torok ................................ 310/162 |
| 5,396,212 | * | 3/1995 | Hernandez et al. ............... 336/223 |

FOREIGN PATENT DOCUMENTS 0 374 805    6/1990    (EP) .............................. H02K/3/26

OTHER PUBLICATIONS

European Search Report for EP 98 12 1619 (Jul. 19, 1999) related to U.S. Application Serial No. 09/055,647.
Patent Abstracts of Japan vol. 96, No. 008, JP08 107665 A, Aug. 30, 1996. (Hitachi Metals Ltd.).
Derwent Abstract of EP 0 374805 A, Dec. 1989.

* cited by examiner

*Primary Examiner*—Nestor Ramirez
*Assistant Examiner*—Judson H. Jones
(74) *Attorney, Agent, or Firm*—Morgan & Finnegan, LLP (57) ABSTRACT

A linear motor utilizing a flat, ironless, printed circuit type winding where the winding can be stamped, etched, or deposited and adhered to a rigid substrate. The winding provides coils that are relatively movable between straight, parallel rows of stationary magnets, or between one row of magnets and a parallel flux return member. In most applications the preferred structure is a moving winding and stationary permanent magnets. The advantage over the existing art is the significantly lower cost to manufacture and the almost limitless ability to create complex windings for improved performance without complicated tooling or winding machines. Also, higher performance is achieved due to a smaller air gap. The structure also provides higher winding stiffness, yet lower mass.

20 Claims, 10 Drawing Sheets

The main straight portion $L_M = 1.0 \cdot L_B$

FIG. 9A

The main straight portion $L_M = 0.5 \cdot L_B$

FIG. 9B

The main straight portion $L_M = 0 \cdot L_B$

FIG. 9C

HIGH PERFORMANCE IRONLESS LINEAR MOTOR WITH SUPPORTED WINDINGS

This invention relates to an improved, high performance, linear electric motor.

BACKGROUND OF THE INVENTION

Linear motors are well known in the art. Many constructions and types have been conceived and utilized in a diverse range of applications requiring linear motion. Most constructions are frameless and consist of primary and secondary windings. Linear induction motors, for example, are commonly used in transportation, material transport and industrial machinery applications.

Linear induction motors suffer from several disadvantages which limit their use in high performance linear motion applications. The air gap required between the primary and the secondary reaction rail is very small, typically on the order of 0.002" to 0.004". This requires either that the support mechanics be of sufficient precision to maintain such clearances over the full length of travel, or the air gap be increased with the resultant loss of motor performance and efficiency. In addition, linear induction motors suffer from inherent low efficiency causing heat dissipation problems.

Much better performance can be achieved in linear motors of the type using permanent magnets. For example, Langley (U.S. Pat. No. 4,369,383) discloses a DC permanent magnet linear motor with a wound iron core. The winding can be either stationary or movable. Commutation in the Langley design is accomplished through a set of brushes which engage a commutator strip on the wound iron core.

The winding of the Langley linear motor design is located in slots between the teeth of an iron core. The permanent magnets in such a design have preferred positions of alignment corresponding to minimum reluctance, otherwise known as cogging. In higher performance applications, the cogging force can create disturbances that affect position and/or velocity accuracy. Secondly, the permanent magnets exhibit a large attractive force to the wound iron core, and therefore the moving portion must be strongly supported by the mechanical structure (i.e. bearings, etc.) to withstand the attractive force. Finally, the wound core has a large mass which often limits the available motor acceleration.

An improvement on the Langley design for many applications is disclosed by von der Heide (U.S. Pat. No. 4,151,447) where an ironless moving coil or primary is positioned between two parallel permanent magnet tracks or one magnet track and a parallel flux return member. Commutation is accomplished electronically, without brushes. The moving slider includes conventional wire-wound coils which can be made with either round or square wire. An advantage of this design is that the slider contains no ferromagnetic material and therefore has no cogging. There is also no magnetic attraction between the slider and the permanent magnet field. Furthermore, the slider, lacking iron, has a significantly lower mass. Such ironless linear motors have significant advantages over iron-core designs in high performance applications.

However, with such ironless designs the moving coil must exist in a relatively large magnetic air gap between the parallel permanent magnet field members. This large air gap causes a reduction in performance because the air gap flux density is considerably reduced. In addition, when the low mass ironless coil is the slider, the slider must be fabricated with sufficient mechanical stiffness to endure the high acceleration that the design facilitates. In the past such rigid structures have been relatively expensive to assemble.

SUMMARY OF THE INVENTION

The linear motor according to the invention utilizes a flat, ironless, printed circuit type winding where the winding can be stamped, etched, or deposited and adhered to a rigid substrate. The winding provides coils that are relatively movable between straight, parallel rows of stationary magnets, or between one row of magnets and a parallel flux return member. In most applications the preferred structure is a moving winding and stationary permanent magnets. The advantage over the existing art is the significantly lower cost to manufacture, the almost limitless ability to create complex windings for improved performance without complicated tooling or winding machines, and higher performance due to a smaller air gap. Also, the structure according to the invention provides higher winding stiffness, yet lower mass.

BRIEF DESCRIPTION OF THE DRAWINGS

The foregoing and other objects of the invention are achieved as described in the following detailed specification which includes the drawings wherein.

DETAILED DESCRIPTION

A linear motor according to a preferred embodiment of the invention is illustrated in FIGS. 1 and 2A–2D. The linear motor includes a moving coil (or "slider") 10 that is a stamped, deposited or etched winding on an insulated substrate. The slider 10 is accommodated in the air gap 17 between parallel arrays of permanent magnet field members 12. The permanent magnets are mounted on back iron members 20 which provide a flux return path for the magnets. There is no limit to the length of the winding or the length of the permanent magnet field arrays.

Winding 10 is a "printed circuit" type structure which can be either a stamped, deposited, or etched conductor pattern that is interconnected to create a complete winding with any desired number of effective coils. Winding 10 is mounted in the slider carriage which can be moved by sliding along rods 16 which are secured to the stationary magnet and back iron structure at the ends.

Figure 1:
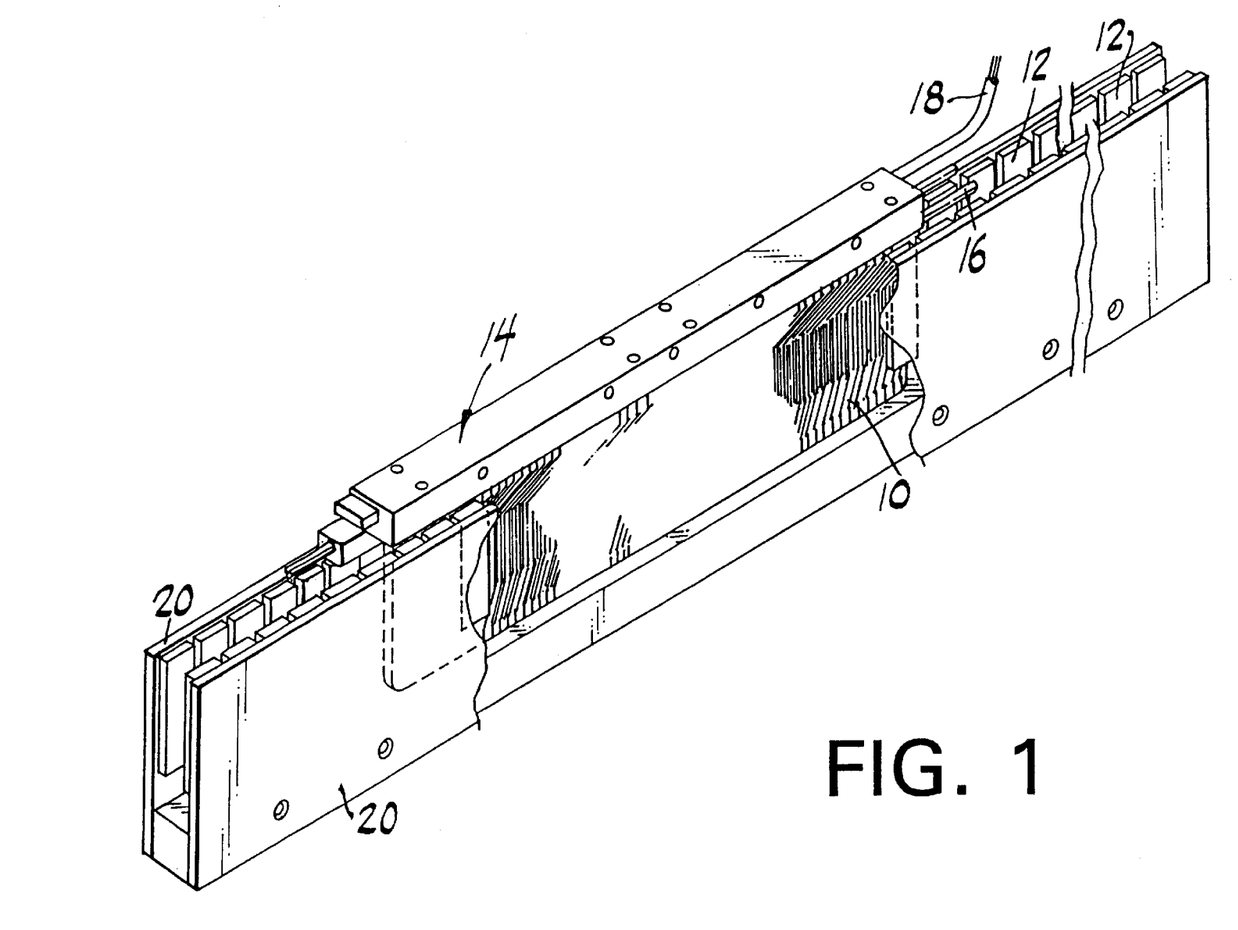
FIG. 1 is a perspective view of a linear motor according to a preferred embodiment where the armature winding is movable with respect to stationary permanent magnets.
Figure 2A:
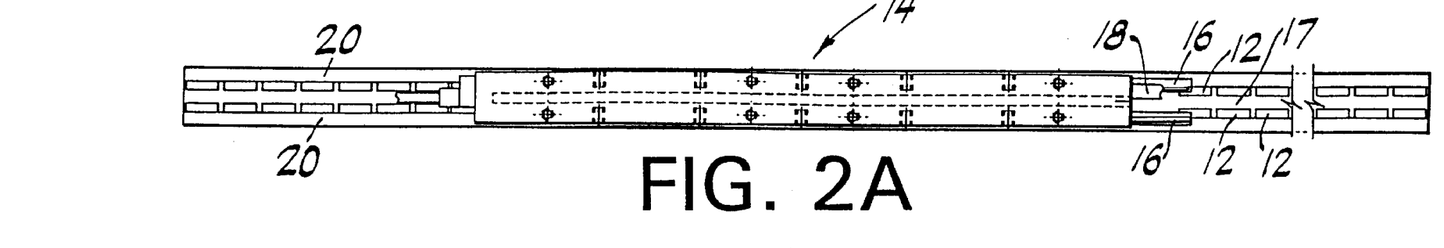
FIGS. 2A–2D are top, bottom, plan and end views of the linear motor shown in FIG. 1.
Figure 2B:
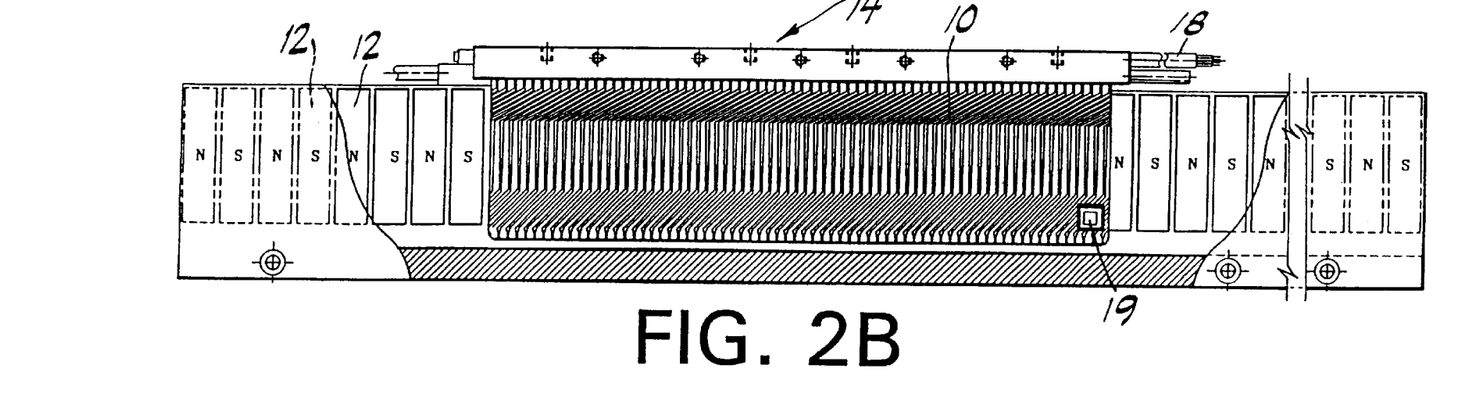
Figure 2C:
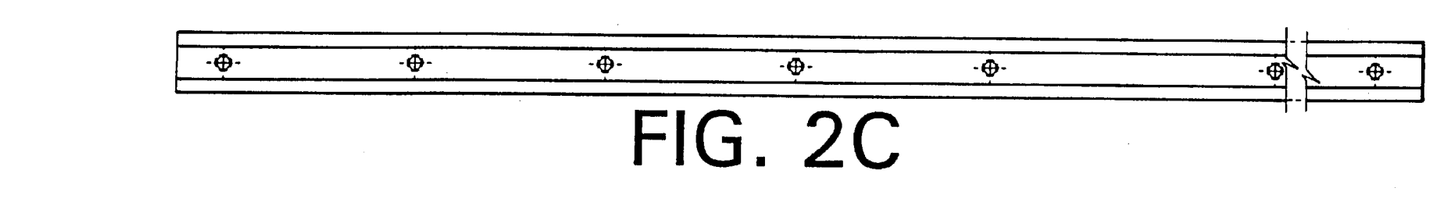
Figure 2D:
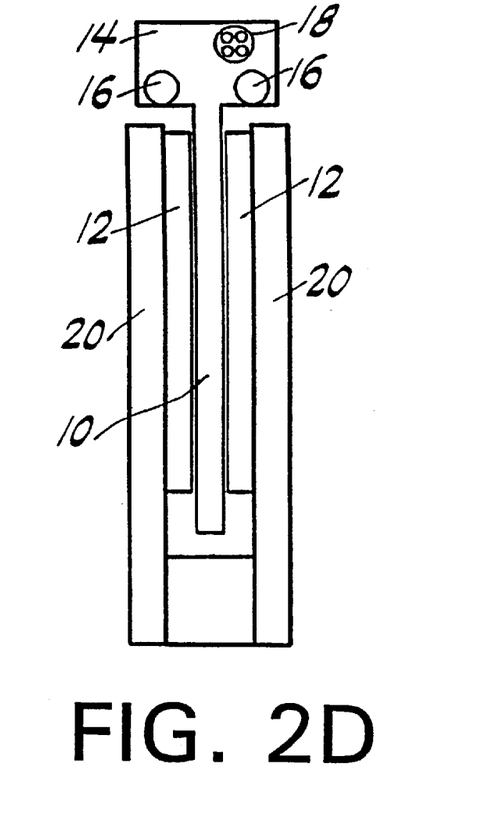

As shown in FIGS. 2A–C, the coil conductors typically have a rectangular cross section and are bonded to a thin, high strength, insulating layer substrate 26 and preferably by a resin epoxy. The substrate can be any electrical insulation material, but typically consists of materials such as Fiberglass, Mylar, Kapton or Nomex insulation. The resulting construction is extremely rigid with a high mechanical stiffness in both the direction of travel and parallel to the magnetic flux path. As such, the winding is self-supporting without the need for any further mechanical support. The armature can therefore be made much thinner than in the case of a conventional wire winding. The winding can be encapsulated in an epoxy-type or plastic material for better thermal properties, but such encapsulation is optional and is not needed for mechanical support. When the windings are mechanically stamped from a copper sheet, the manufacturing cost is very low. The stamped pattern is adhesively adhered to the insulating substrate, and then the bridging connections between conductors on opposite sides of the substrate are made by welding. In an alternate construction the conductor patterns may be created by depositing the copper pattern on a substrate such as a PC board or by etching the pattern into a copper-clad board. The etched or deposited conductor patterns on opposite sides of the substrate can be interconnected by through hole plating.

The air gap flux, and therefore the motor force constant Kf, are a direct function of the air gap between the poles of the facing magnets. A thinner winding structure is generally desirable to increase the motor force constant and to reduce the slider weight. An increase in the motor force constant Kf and the reduced weight of the slider enhance performance and increase the possible acceleration.

Figure 8A:
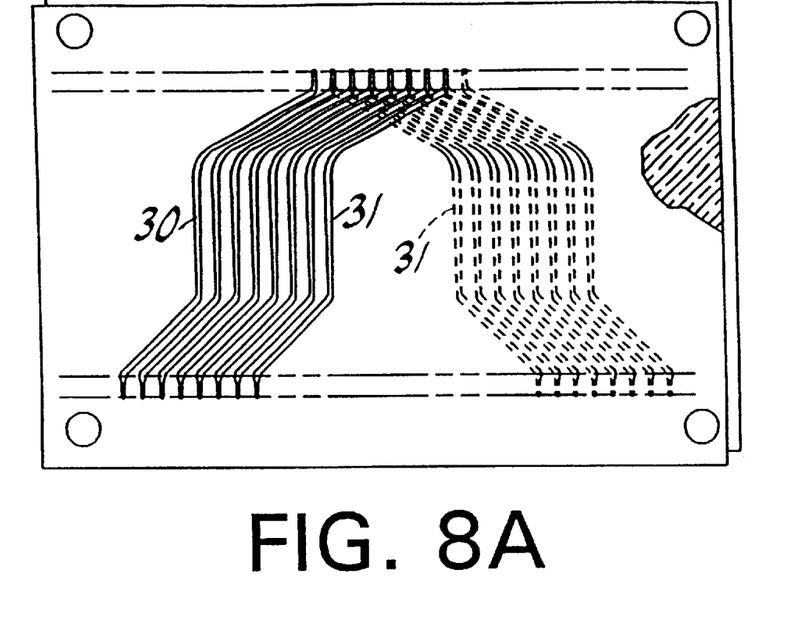
FIG. 8A illustrates a wave armature winding configuration.
Figure 8B:
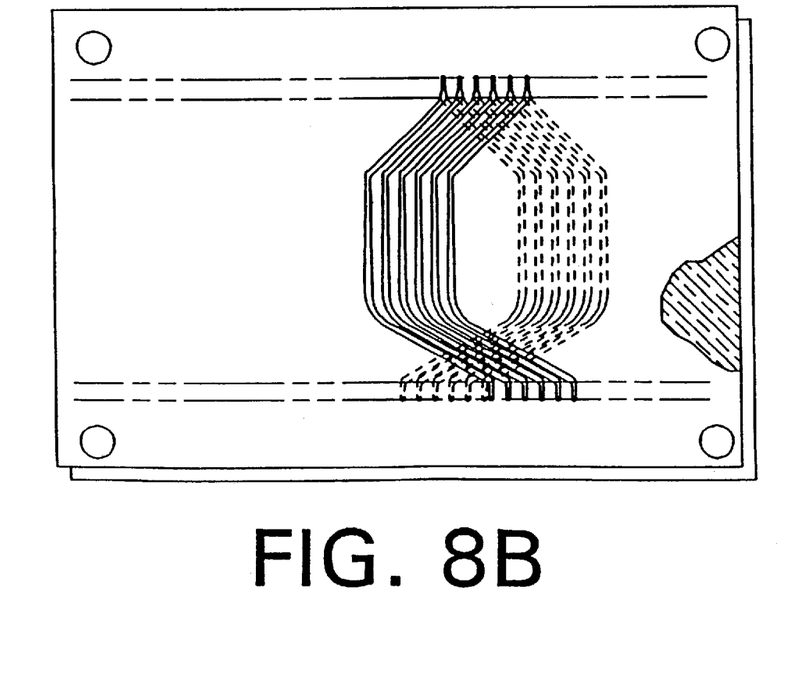
FIG. 8B illustrates a lap armature winding configuration and FIG. 8C illustrates the relationship of the armature winding coil relative to the permanent magnets.
Figure 8C:
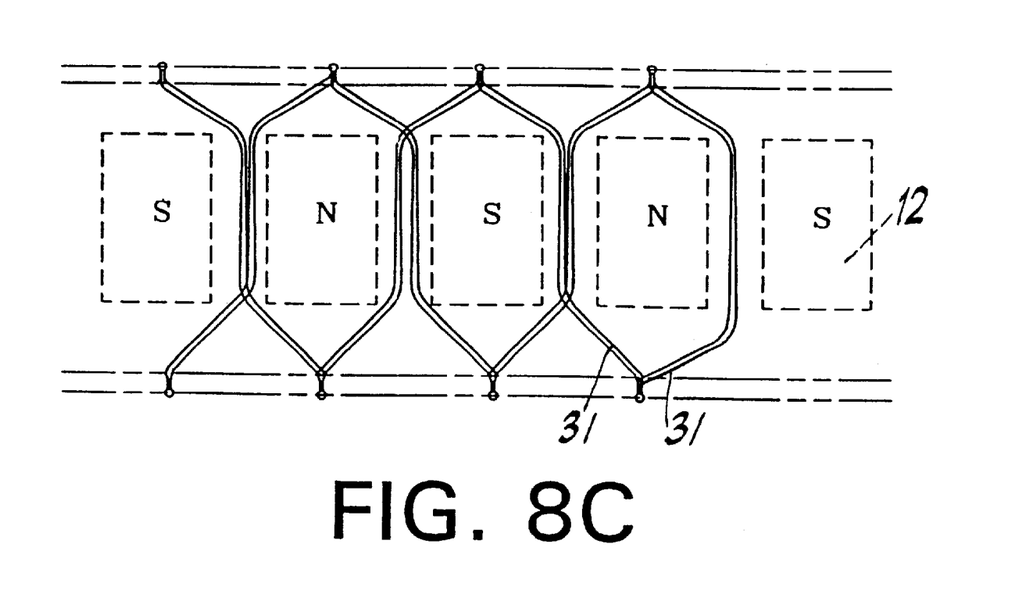

The armature winding conductor pattern can be a wave winding configuration where a conductor 30 of a coil 31 spans approximately the distance between adjacent pole face centers as shown in FIG. 8A. The conductor pattern can also be of a lap configuration as shown in FIGS. 8B and 8C. The spatial relationship of the armature winding coils to the permanent magnets is shown in FIG. 8C. Generally, the coil span is approximately equal to the distance between adjacent magnet pole centers. However, other arrangements are possible to, for example, adjust the shape of the motor back emf. Each coil consists of a pair of conductors located on opposite sides of insulating substrate 26. In the case of stamped, etched or laser cut conductor patterns in which the ends of the conductors extend beyond the insulating substrate, the conductor ends can be welded to form bridging connections. In the case of deposited or etched conductor patterns on a substrate, the connections between conductors on opposite sides of the insulating substrate can be made by through hole plating interconnections.

Figure 9A:
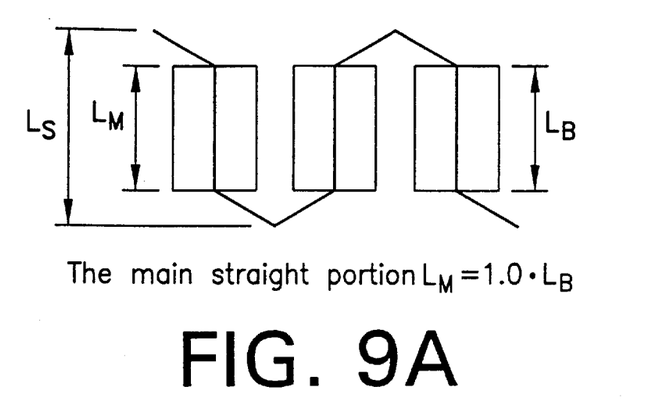
FIGS. 9A to 9C illustrate windings with straight portions of different lengths.
Figure 9B:
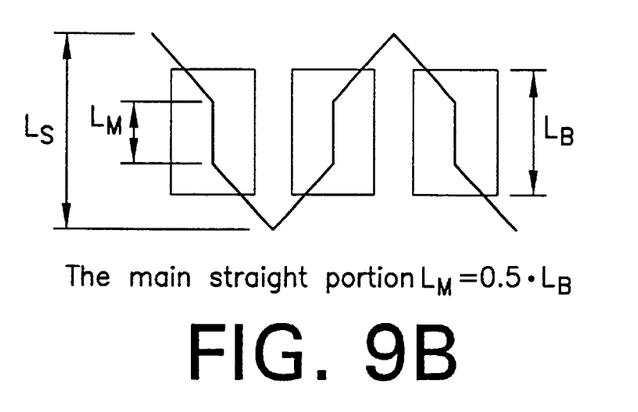
Figure 9C:
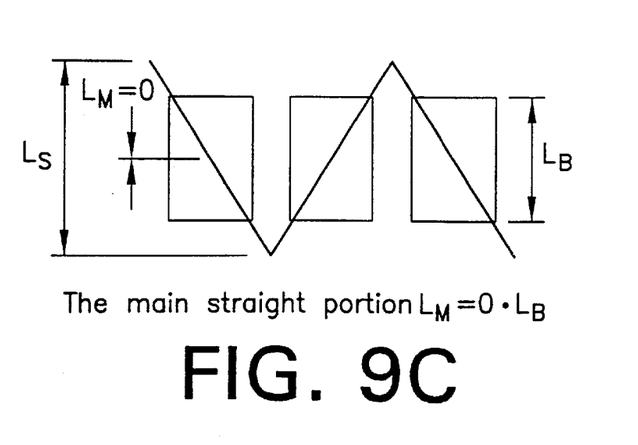

By adjusting the conductor pattern in the wave and or the lap configuration, the important performance characteristics in the motor can be selectively optimized as shown in FIGS. 9A to 9C. Referring to FIG. 9A, which is a wave configuration, the ratio of the straight portion of the conductor Lm perpendicular to the direction of movement to the overall height of the air gap Ls can be adjusted as desired. Adjusting this ratio affects four key motor parameters, namely, the motor back emf Ke, the motor force constant Kf, the winding resistance R, and the motor force ripple Fr. Selected performance characteristics can be optimized by adjusting the Lm to Ls ratio. One of the advantages of the invention is that this ratio can be easily adjusted as required. For example, reducing the Lm to Ls ratio to 0 (FIG. 9C) creates a helical type winding and produces the lowest winding resistance. This can be advantageous in designs where it is important to reduce motor Joule losses. As another example, the motor force constant can be optimized by using a high Lm to Ls ratio (approaching 1.0, as shown in FIG. 9A) such that the conductor straight portion is long and orthogonal to the direction of motion.

Additionally, adjusting the Lm to Ls ratio has an important effect on the motor back emf wave shape, and thereby, the motor force ripple. For example, when the Lm to Ls ratio is high (approaching 1.0, as shown in FIG. 9A), the motor back emf wave shape tends to be more trapezoidal. This wave shape is also affected by the magnet width and the winding pitch. As the Lm to Ls ratio approaches 0, the back emf wave shape becomes more sinusoidal. Adjusting this back emf wave shape according to the intended drive electronics is a significant factor in reducing the motor force ripple. The flexibility of the proposed design allows for the practical elimination of motor force ripple.

According to the invention many configurations are easily achieved without concern for slot shapes, winding machines, and difficult tooling in order to optimize the motor parameters mentioned above. Conventional linear motors with wire wound coils must rely on expensive tooling and winding machines, or complicated retaining slots to achieve such flexibility, if it can be achieved at all. The stamped, etched, or deposited winding of the proposed invention can achieve any winding configuration without additional tooling, without slots, or additional cost. In addition to the linear configuration shown in FIGS. 9A to 9C, curvilinear configurations are also practical.

Several techniques can be used to provide commutation of armature winding 10 in the moving slider. A moving cable 18 (FIG. 1) on the slider 14 can be used to bring power to the armature winding coils in the correct sequence. The number of coils in the armature winding depends on the application and the amount of force and travel needed. A single phase coil is sufficient to create linear movement. However, for continuous movement over longer distances several coils are preferably connected in a number of phases. The phases of the winding are electronically commutated. A sensor 19 is typically attached to or is embedded in the moving armature to sense the position of the winding relative to the stationary magnets. The sensors may be optical, magnetic, capacitive, or inductive. A typical application employs Hall effect sensors to sense the magnet location. Another possible arrangement is to use the armature-generated back EMF to indicate position. Using the correct ratio of magnet pitch to coil pitch, the back EMF can be modified to the desired wave shape which, in most cases, is sinusoidal. Electronic commutation is well known in the art and is employed in many rotary and linear motors to eliminate the need for mechanical brushes. A transistor array (not shown) is built into slider 14 and energizes the winding coils in the correct sequence as indicated by sensor 19.

The slider contains no ferromagnetic material and therefore has a very low mass. In addition, there is no cogging force or preferred position of magnetic orientation. The absence of ferromagnetic material also means that there are no saturation effects to consider in the armature.

Figure 3A:
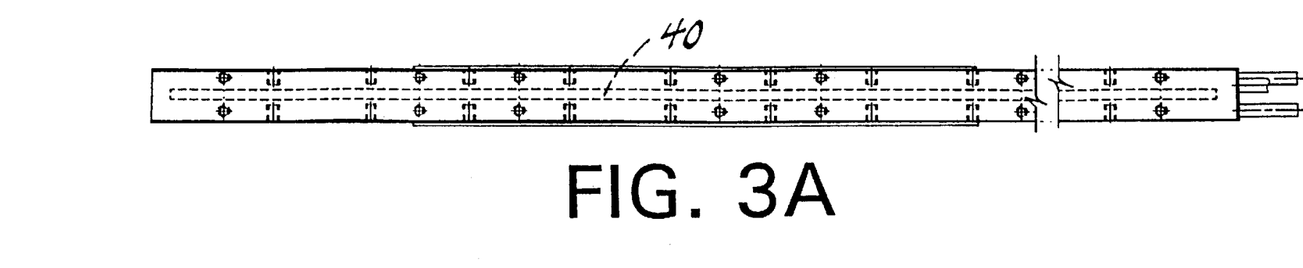
FIGS. 3A–3C are an alternate linear motor structure wherein the permanent magnets are movable relative to a stationary armature winding.
Figure 3B:
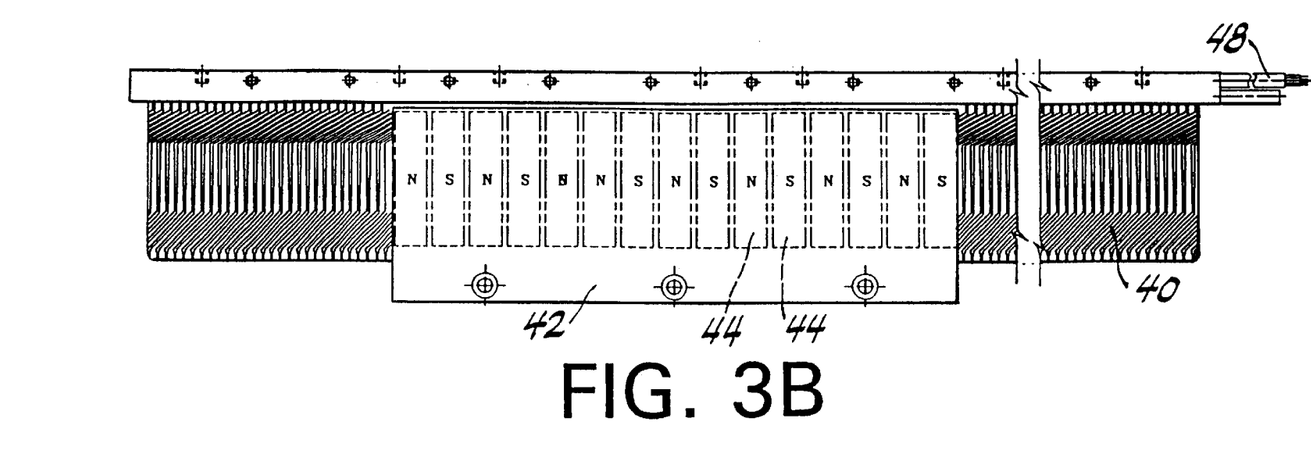
Figure 3C:
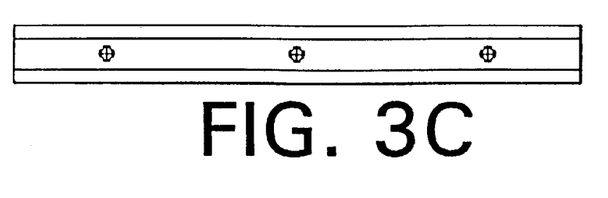

In an alternate construction shown in FIGS. 3A–3C the armature winding 40 remains stationary and the magnet assembly 44 is moving. This arrangement may be desirable in very short stroke applications because of the additional weight of the moving member. With this construction power cable 18 and the feedback cable (if any) remain stationary thereby eliminating the need for a cable carrier and the flexing that a moving cable must endure.

Figure 4A:
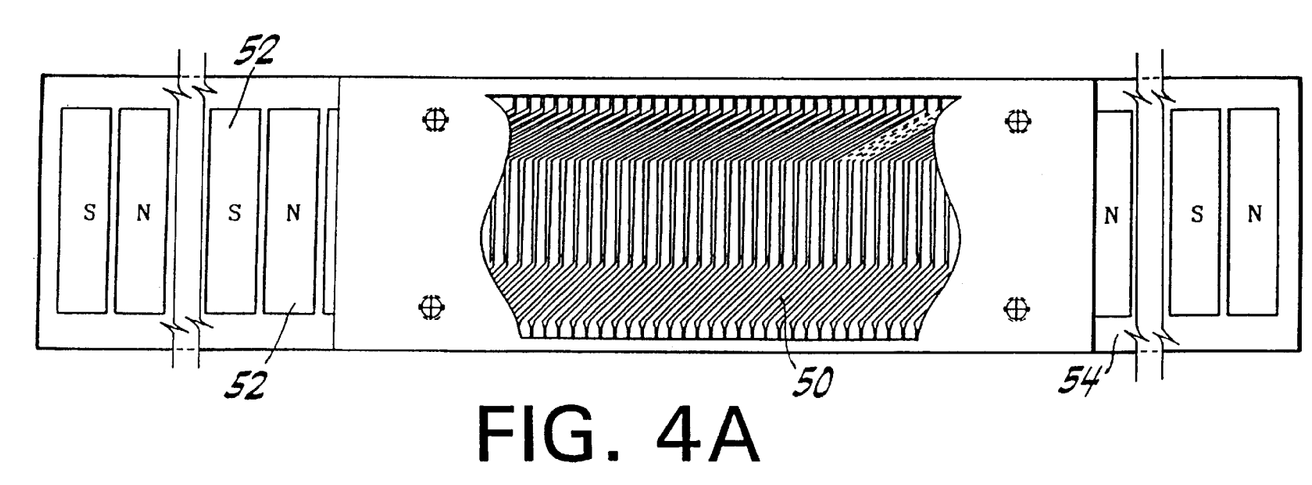
FIGS. 4A and 4B are side and end views, respectively, of an alternate structure wherein the armature winding is movable relative to a single row of stationary magnets.
Figure 4B:
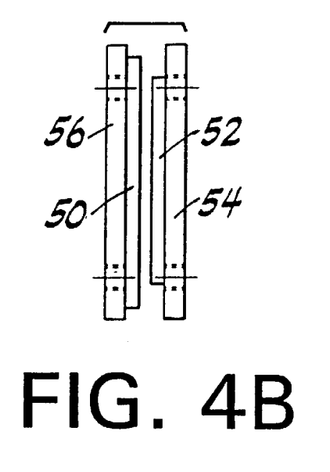

A further embodiment is illustrated in FIGS. 4A and 4B. The armature winding 50 is secured to a ferromagnetic plate 56 with a thin insulating layer between the winding and the plate. Parallel to the winding/plate assembly is a single row of permanent magnets 52 secured to a ferromagnetic plate 54. The ferromagnetic plate provides a flux return path and reduces the total magnetic air gap. In this configuration, two constructions and modes of operation are possible. In the first mode, the winding/plate assembly moves and is shorter than the row of permanent magnets which is stationary (FIG.

4A). The winding/plate assembly has a higher mass than in the preferred configuration. Also, some magnetic attraction between the slider and the stationary permanent magnets results, and the ends of the ferromagnetic plate can create some cogging force due to "end effects". However, the plate supporting the winding serves to reduce the magnetic air gap and increase thermal dissipation from the winding. In addition, in some applications, this configuration can save cost because the second parallel row of stationary magnets is eliminated.

Commutation of the moving winding is accomplished in the same manner as in the preferred configuration, namely electronically using a position sensor as is well known in the art in other types of motors. Alternatively, the winding/plate assembly could remain stationary and the magnet assembly moving. The advantage of this last embodiment is in eliminating moving cables.

Figure 5A:
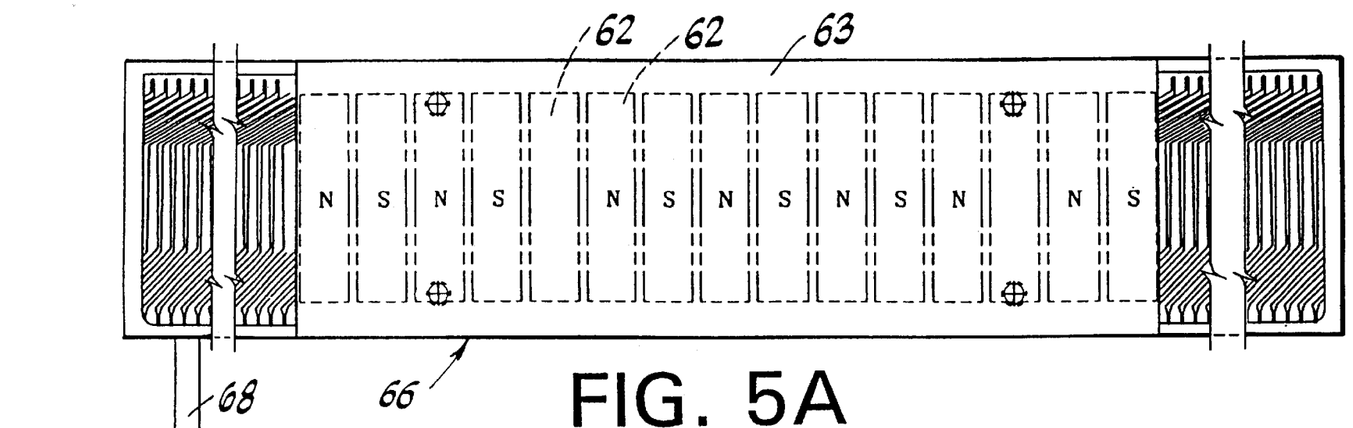
FIGS. 5A–5C illustrate another preferred embodiment wherein a single row of magnets is movable relative to a stationary winding.
Figure 5B:
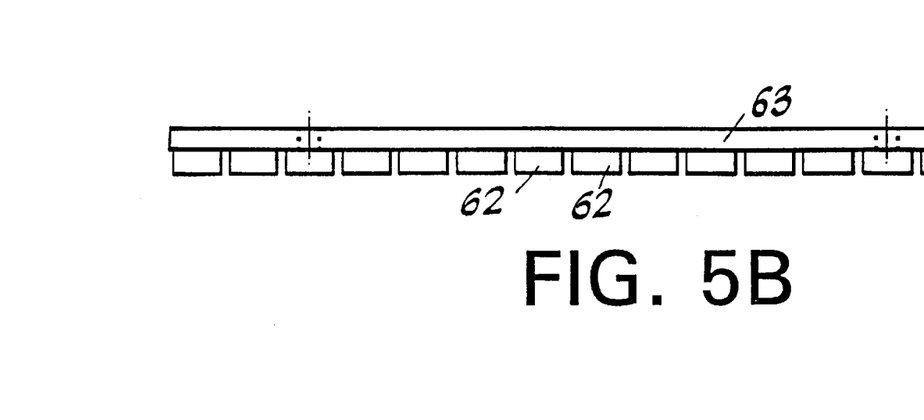
Figure 5C:
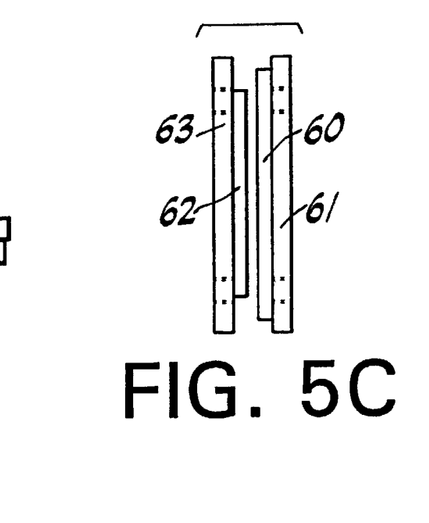

In the second mode of operation the winding/plate assembly is held stationary and is longer than the moving magnet assembly, as shown in FIGS. 5A–5C. If the magnet assembly 62 is stationary within the length of the stationary winding/plate assembly, no cogging force results due to the absence of teeth or 'ends'. There is some attraction between the magnets and the winding/plate assembly which must be supported by the mechanical structure, but it is considerably lower than in conventional iron core designs. As in the first mode of operation, the ferromagnetic plate 61 on the back of the winding increases thermal dissipation from the armature and reduces the magnetic air gap. However, the stationary plate can be attached to a larger mass (for example, the bed of the machine) thereby increasing thermal dissipation. The power cable is stationary. The mass of the moving magnet assembly can be minimized to enhance acceleration. The number of magnets is restricted only to the number needed to develop the required force, and therefore, is very economical.

Commutation can again be accomplished electronically using the appropriate feedback to indicate the position of the moving magnet assembly. If the armature is divided, for instance, into two or more phases, when each phase is energized, according to the position of the moving magnet assembly, the entire phase is energized and dissipates heat even though the moving magnet assembly is only over part of the phase. The remainder of the phase creates heat, but does no effective work. For longer travels, therefore, this second mode of design becomes less desirable because to minimize the number of power transistors in the electronics it is common to minimize the number of phases. A higher number of phases would reduce the heat dissipation, but with a higher resultant electronics cost.

Figure 7A:
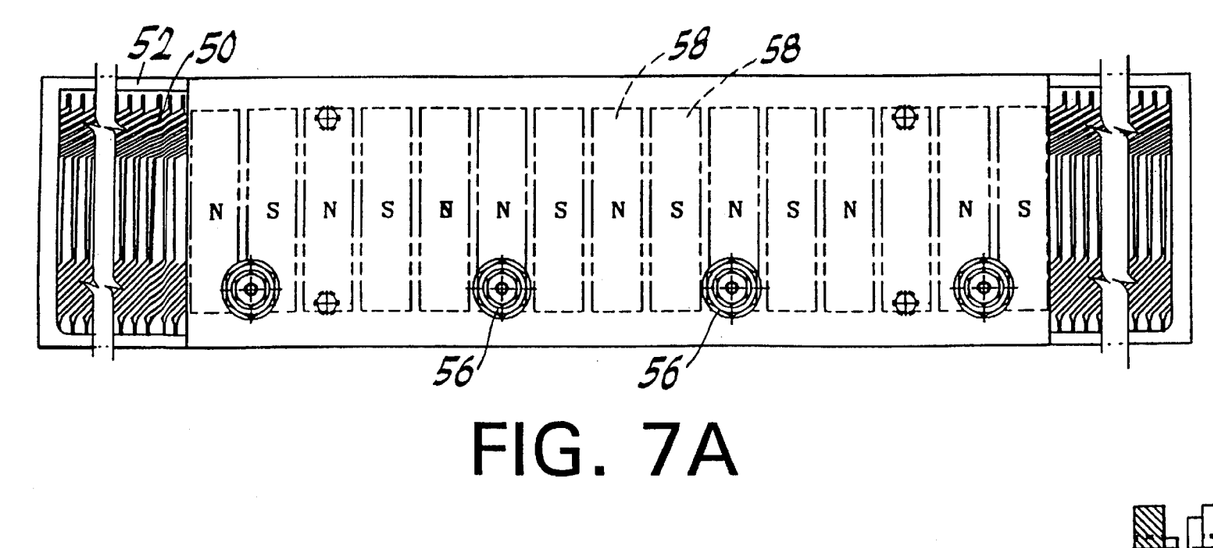
FIGS. 7A–7C are side, cross-sectional and end views, respectively, of a linear, brush-type motor according to the invention wherein a single row of magnets is movable relative to a stationary armature winding.
Figure 7B:
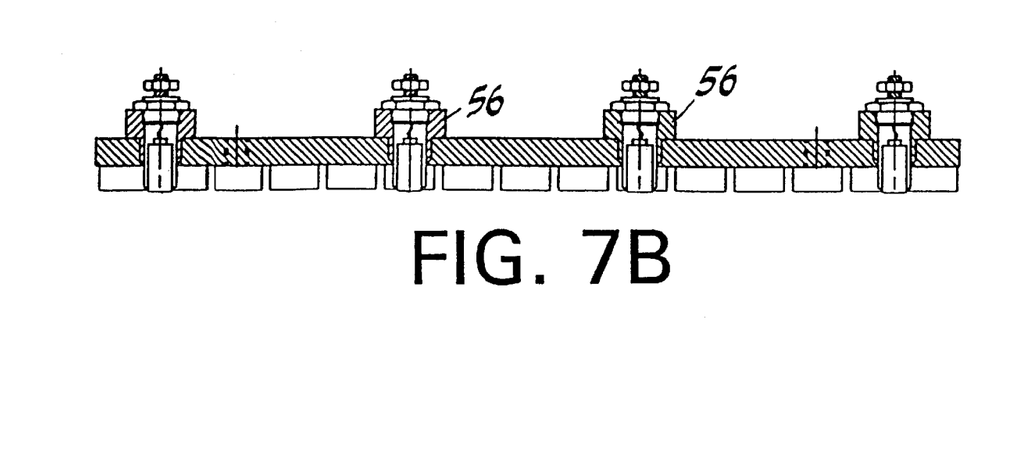
Figure 7C:
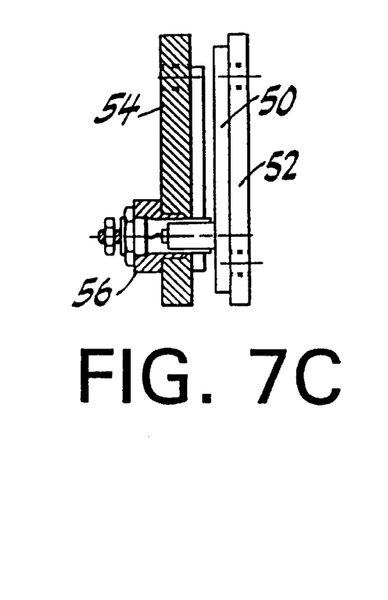

Another embodiment for linear motors according to the invention is disclosed in FIGS. 7A–7C. An armature winding 50 is attached to a ferromagnetic plate 52 and is held stationary. A set of mechanical brushes 56 (typically carbon) are placed on a moving magnet assembly 58 to commutate the individual coils in the winding according to the position of the winding relative to the magnets. To avoid the need for a moving cable to bring power to the brushes on the moving magnet assembly, a second set of brushes can be used to pick up power from a stationary power rail (not shown) running parallel to the stationary armature. A stationary power cable can then bring power to the power rail. The commutating surface for the mechanical brushes is directly on an area of the armature winding that has been polished for smooth commutation. No separate commutator strip is required.

Although mechanical commutation is a disadvantage, the design in FIGS. 7A–7C has several advantages. The number of magnets is minimized to only those needed to generate the necessary force. Since magnet cost is a major component in the cost of linear motors, this is a large advantage. Second, the stationary armature winding has the benefit of good heat transfer through stationary flux plate 54. Third, the power cables are stationary. Fourth, the motor is self commutating simplifying electronics and eliminating the need for commutating feedback. Fifth, although the ferromagnetic plate provides the benefit of improved thermal dissipation and a reduced magnetic air gap, there is no cogging because there are no end pieces and no teeth. Sixth, the armature inductance is very low, which reduces arcing, the main contributor to wear in mechanical commutation.

Figure 6A:
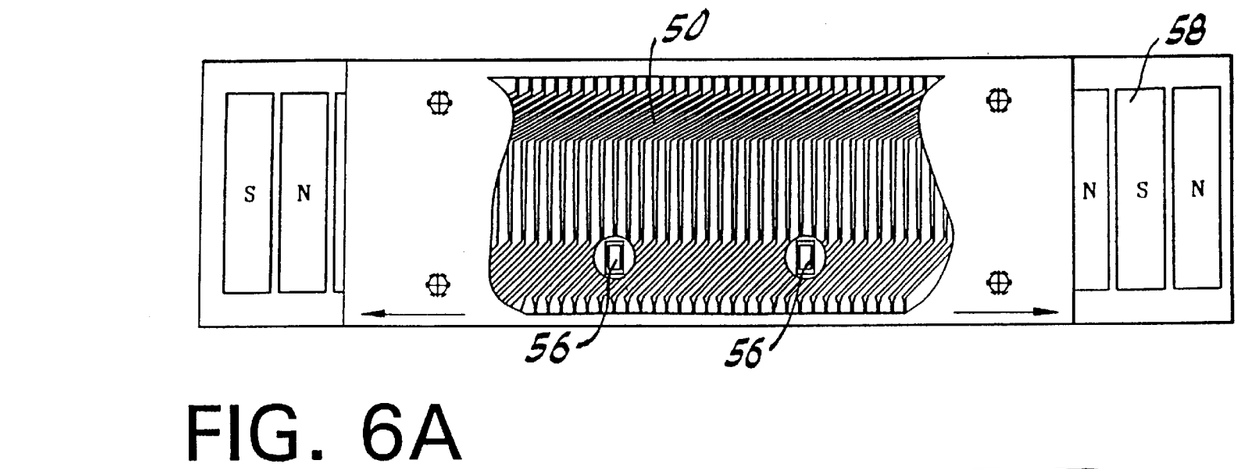
FIGS. 6A–6B are side and end views, respectively, illustrating a moving winding commutated using brushes.
Figure 6B:
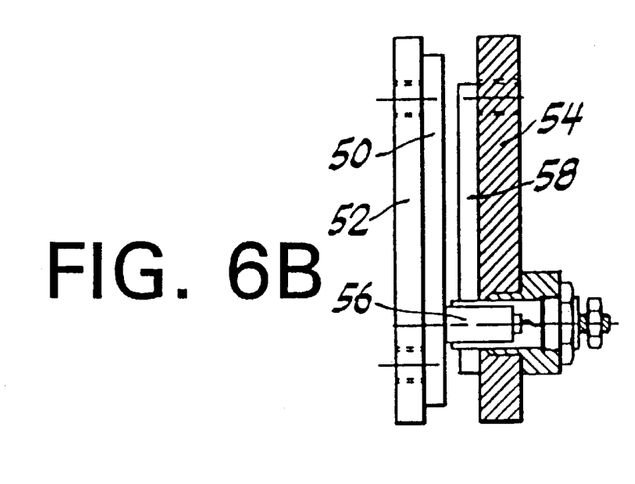

The configuration in FIGS. 7A–7C can also be reversed such that the armature winding moves and the magnet assembly is stationary as shown in FIGS. 6A–6B.

The permanent magnets used in the embodiments of the invention can be of many types including rare earth, ferrite, and alnico. Alnico is possible only in constructions where the magnetic circuit is completely closed at all times such as where the armature moves between two parallel magnet plates. The preferred permanent magnets are neodymium-iron-boron alloys. The permanent magnet assemblies can easily be replaced by a wound field if desirable. The permanent magnet assembly can be enhanced by arranging magnetic pole pieces on the faces of magnets to shape or focus the flux. Also, the magnets can be embedded in ferromagnetic material to achieve further flux density enhancement. It should be noted that the absence of ferromagnetic pole teeth on the armature assembly in any of the disclosed configurations facilitates such enhancements without concern for the iron saturation that normally occurs in conventional designs.

The present invention has thus made it possible to achieve a linear motor, very flexible in its application, built in many possible configurations, with many advantages including improved performance, lower mass for higher acceleration and lower manufacturing cost. Many further variations are possible without departing from the scope of the invention which is defined in the appended claims.

What is claimed is:

1. A slotless linear motor comprising:
   a plurality of permanent magnets providing alternating magnetic pole faces disposed along a linear air gap;
   a linear winding located in said air gap and including
      a plurality of layered flat conductor patterns, and
      insulating layers between adjacent ones of said flat conductor pattern;
   said linear winding being a stamped conductor pattern;
   said linear winding and said alternating magnetic pole faces being mounted for relative linear movement;
   magnetic material providing a flux return path for said permanent magnets and across said linear air gap; and
   means for energizing said winding according to the position of said winding relative to said permanent magnets.

2. A slotless linear motor according to claim 1 wherein said permanent magnets are stationary and said linear winding is movable relative to said permanent magnets.

3. A slotless linear motor according to claim 1 wherein said permanent magnets are movable and said winding is stationary.

4. A slotless linear motor comprising:
   a plurality of stationary permanent magnets providing alternating magnetic pole faces disposed along a linear air gap;
   a linear winding located in said air gap moveable relative to said stationary permanent magnets and including
      a plurality of layered flat conductor patterns, and
      insulating layers between adjacent ones of said flat conductor patterns;

said linear winding being a stamped conductor pattern;

said linear winding being moveable relative to said stationary permanent magnets;

magnetic material providing a flux return path for said permanent magnets and across said linear air gaps; and means for energizing said winding according to the position of said winding relative to said stationary permanent magnets.

5. A slotless linear motor comprising:

a plurality of stationery permanent magnets providing alternating magnetic pole faces disposed along a linear air gap;

a linear winding located in said air gap and including
a plurality of layered flat conductor patterns, and
insulating layers between adjacent ones of said flat conductor patterns;

said linear winding being a stamped conductor pattern;

said linear winding being stationary and said alternating magnetic pole faces being mounted for linear movement relative to said winding;

magnetic material providing a flux return path for said permanent magnets and across said linear air gaps; and means for energizing said winding according to the position of said winding relative to said stationary permanent magnets.

6. A slotless linear motor according to claims 1, 4 or 5 wherein said means for energizing said winding includes brushes bearing upon said layered conductor pattern.

7. A slotless linear motor according to claims 1, 4 or 5 wherein said means for energizing said winding is brushless.

8. A slotless linear motor according to claims 1, 4 or 5 wherein said means for energizing said winding includes Hall effect position detectors.

9. A slotless linear motor according to claims 1 or 4 wherein said permanent magnets are located on both sides of said linear air gap.

10. A slotless linear motor according to claims 1, 4 or 5 wherein said permanent magnets are located only on one side of said air gap.

11. A slotless linear motor according to claim 5 wherein said stationary winding is distributed along both sides of said linear air gap.

12. A slotless linear motor comprising:

a plurality of permanent magnets providing alternating magnetic pole faces disposed along a linear air gap;

a linear winding located in said air gap and including
a plurality of layered flat conductor patterns, and
insulating layers between adjacent ones of said flat conductor patterns;

said linear winding and said alternating magnetic pole faces being mounted for relative linear movement; said layered flat conductor patterns including conductor portion perpendicular to the direction of said linear movement;

the ratio of the length of said perpendicular conductor portion to the height of said linear air gap being selected according to desired performance characteristics;

magnetic material providing a flux return path for said permanent magnets and across said linear air gap; and means for energizing said winding according to the position of said winding relative to said permanent magnets.

13. A method of design for a slotless linear motor including a permanent magnet providing pole faces disposed along a linear air gap,
a plurality of conductors secured to an insulating layer and movable relative to said pole faces; said method including the steps of (1) configuring said conductors so that at least a part of such conductor $L_m$ is generally perpendicular to the direction of movement and (2) selecting the ratio of the length of said generally perpendicular portion to the height $L_s$ of said linear air gap according to desired performance characteristics.

14. The method according to claim 13 wherein the ratio $L_m:L_s$ is small, close to zero to obtain low resistance and a generally sinusoidal wave shape.

15. The method according to claim 13 wherein the ratio $L_m:L_s$ is large approaching 1 to obtain a relatively high force constant.

16. A method for making a slotless motor comprising the steps of:

creating a linear winding including layered conductor patterns secured to the surfaces of an insulating layer, said linear winding being formed as stamped conductor patterns;

creating a linear air gap by locating a plurality of permanent magnets with pole faces disposed along said linear air gap;

mounting said linear winding in said air gap for linear movement relative to said permanent magnets; and locating magnetic material to provide a flux return path for said permanent magnets across said linear air gap.

17. A slotless linear motor comprising:

a plurality of permanent magnets providing alternating magnetic pole faces disposed along a linear air gap;

a linear winding located in said air gap and including
a plurality of layered flat conductor patterns, and
insulating layers between adjacent ones of said flat conductor pattern;

said linear winding being a printed circuit or etched circuit;

said linear winding and said alternating magnetic pole faces being mounted for relative linear movement;

magnetic material providing a flux return path for said permanent magnets and across said linear air gap; and means for energizing said winding according to the position of said winding relative to said permanent magnets.

18. The slotless linear motor according to claim 17, wherein the linear winding comprises at least four layers.

19. A method for making a slotless motor comprising the steps of:

creating a linear winding including layered conductor patterns secured to the surfaces of an insulating layer, said linear winding being formed as printed circuits or by etching;

creating a linear air gap by locating a plurality of permanent magnets with pole faces disposed along said linear air gap;

mounting said linear winding in said air gap for linear movement relative to said permanent magnets; and locating magnetic material to provide a flux return path for said permanent magnets across said linear air gap.

20. The slotless linear motor according to claim 19, wherein the linear winding comprises at least four layers.

* * * * *